United States Patent
Vuopionpera et al.

(10) Patent No.: US 9,706,270 B2
(45) Date of Patent: Jul. 11, 2017

(54) OPTIMISING PACKET SWITCHED NETWORKS

(75) Inventors: Raimo Vuopionpera, Helsinki (FI); Attila Takacs, Budapest (HU); Boris Dortschy, Hägersten (SE); Henrik Almeida, Hägersten (SE); Attila Bader, Paty (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1127 days.

(21) Appl. No.: 12/676,895

(22) PCT Filed: Jun. 30, 2008

(86) PCT No.: PCT/EP2008/058364
§ 371 (c)(1),
(2), (4) Date: Mar. 25, 2010

(87) PCT Pub. No.: WO2009/030537
PCT Pub. Date: Mar. 12, 2009

(65) Prior Publication Data
US 2010/0303076 A1    Dec. 2, 2010

(30) Foreign Application Priority Data
Sep. 7, 2007   (GB) .................................. 0717408.9

(51) Int. Cl.
*H04L 12/28*   (2006.01)
*H04Q 11/00*   (2006.01)
(Continued)

(52) U.S. Cl.
CPC ......... *H04Q 11/0005* (2013.01); *H04L 45/24* (2013.01); *H04Q 11/0066* (2013.01);
(Continued)

(58) Field of Classification Search
CPC ........................................................ H04L 12/66
(Continued)

(56) References Cited

U.S. PATENT DOCUMENTS 4,679,191 A * 7/1987 Nelson et al. ................. 370/355
6,768,827 B2 * 7/2004 Yoo ................................ 385/14
(Continued)

FOREIGN PATENT DOCUMENTS

| EP | 0550046 A2 | 12/1992 |
|---|---|---|
| WO | 03/060624 A2 | 7/2003 |
| WO | WO 03/062879 A | 7/2003 |

OTHER PUBLICATIONS

Li, Xinwan, et al.; "The Study of Dual-wavelength Parallel Photonic/Electronic Packet Communication" Chinese Journal of Electronics, vol. 9, No. 3, pp. 313-317; Jul. 2000.
(Continued)

*Primary Examiner* — Shaq Taha
*Assistant Examiner* — Lionel Preval

(57) ABSTRACT

A method of routing packets between nodes of a packet switched network, the method comprising receiving a packet at a first node, the packet comprising routing information and payload data, sending said routing information to a second node in the routing path via a first transmission medium having a relatively high transmission speed, and sending said payload data to said second node via a second transmission medium having a relatively low transmission speed. Upon receipt of said routing information, said second node is able to prepare or begin preparation for onward routing of the packet in advance of receipt of said payload.

12 Claims, 5 Drawing Sheets

(51) Int. Cl.
  *H04L 12/707* (2013.01)
  *H04L 12/701* (2013.01)
(52) U.S. Cl.
  CPC ...... *H04L 45/00* (2013.01); *H04Q 2011/0039* (2013.01); *H04Q 2011/0073* (2013.01)
(58) Field of Classification Search
  USPC ........ 370/352, 355, 392; 455/426.1; 385/14, 385/15; 709/227
  See application file for complete search history.

(56) References Cited

U.S. PATENT DOCUMENTS

| | | | |
|---|---|---|---|
| 6,850,707 B1 | 2/2005 | Chang | |
| 7,958,242 B2 * | 6/2011 | Rey | 709/227 |
| 2003/0002773 A1 * | 1/2003 | Parker et al. | 385/15 |
| 2003/0043437 A1 * | 3/2003 | Stough et al. | 359/173 |
| 2003/0133641 A1 * | 7/2003 | Yoo | 385/14 |
| 2003/0188014 A1 | 10/2003 | Gradischnig | |
| 2006/0019655 A1 * | 1/2006 | Peacock | 455/426.1 |
| 2006/0221933 A1 * | 10/2006 | Bauer et al. | 370/352 |

OTHER PUBLICATIONS

Hancock, R., et al.; "Next Steps in Signaling (NSIS): Framework"; Network Working Group, Request for Comments: 4080; The Internet Society, Jun. 2005.
Le Faucheur, Francois, et al.; "Resource ReSerVation Protovol (RSVP) Extensions for Emergency Services"; Internet-Draft, Intended Status: Standards Track; Cisco Systems, Inc., Mar. 2007.

* cited by examiner

| Signal Velocity in Various Media | | | |
|---|---|---|---|
| Material | Propagation velocity (fraction of speed of light in a vacuum) | Index of refraction | Velocity of signal (km/s) |
| Optical fiber | .68 | 1.46 | 205,000 |
| Flint glass | .58 | 1.71 | 175,000 |
| Water | .75 | 1.33 | 226,000 |
| Diamond | .41 | 2.45 | 122,000 |
| Air | .99971 | 1.00029 | 299,890 |
| Copper wire (category 5 cable) | .77 | N/A | 231,000 |

Figure 1

OPTIMISING PACKET SWITCHED NETWORKS

TECHNICAL FIELD

The present invention relates to a method and apparatus for optimising packet switched networks and more particularly to a method and apparatus for optimising the forwarding of packets within such networks.

BACKGROUND

In a typical packet switched network, each packet contains its own forwarding or routing data (presented differently in almost every OSI layer) that nodes (e.g. routers in the IP layer) between the end points must read in order to make next hop routing decisions. The parts of the forwarding data that is used in forwarding decisions depends both on the transport media and the networking technology. Although there exist solutions to make this forwarding as fast as possible (e.g. GMPLS=Generalized Multi Protocol Label Switching), these tend to operate only after the first few packets have been transmitted and are efficient only for relatively stable configurations between the end points. Even so, routing decisions can only be made once the whole packet, data and routing information, has arrived.

It will be appreciated that circuit switched networks (e.g. PSTN networks) do not have this problem of per packed switching along the data transmission path between the end points, since the path is already determined before transmission. However, circuit switched networks require a more complex signalling architecture in order to create and maintain communication paths, and to and releases network resources when the need for communication between parties ceases to exist.

It is desirable to provide for circuit switched like behaviour across packet switched networks, allowing routing decisions to be made at routing nodes prior to receipt of actual data packets.

SUMMARY

According to a first aspect of the present invention there is provided a method of routing packets between nodes of a packet switched network. The method comprises receiving a packet at a first node, the packet comprising routing information and payload data. The routing information is then sent to a second node in the routing path via a first transmission medium having a relatively high transmission speed, whilst the payload data is sent to said second node via a second transmission medium having a relatively low transmission speed. Upon receipt of said routing information, said second node prepares or begins preparation for onward routing of the packet in advance of receipt of said payload.

According to an embodiment of the invention, both the routing information and the payload data may be sent via said second transmission medium, in addition to sending the former via said first transmission medium.

The first transmission medium may comprise a radio interface whilst said second transmission media comprises a fiber optic cable. Alternatively, said first transmission medium may comprise a copper wire whilst said second transmission medium comprises a fiber optic cable. Of course, a wide range of other options exist.

It is possible that said first and second transmission media are provided as different channels across the same physical transmission path.

According to a second aspect of the present invention there is provided apparatus for routing packets across a packet switched network. The apparatus comprises a first egress interface for attachment to a first transmission medium having a relatively high transmission speed, and a second egress interface for attachment to a second transmission medium having a relatively low transmission speed. Processing means is provided for sending packet forwarding information across said first transmission medium via said first egress interface, and for sending payload data across said second transmission medium via said second egress interface.

Said processing means may be arranged to extract said forwarding information from a received data packet containing both forwarding information and payload data.

Said first egress interface may be a radio interface whilst said second egress interface is an optical fiber interface. Alternatively, said first egress interface may be a copper wire interface whilst said second egress interface is a fiber optic cable interface.

Said first egress interface may be a fiber optic interface arrange to transmit at a first carrier frequency whilst said second egress interface is a fiber optic interface arrange to transmit at a second, different carrier frequency.

According to a third aspect of the present invention there is provided apparatus for routing packets across a packet switched network. The apparatus comprises a first ingress interface for attachment to a first transmission medium having a relatively high transmission speed, a second ingress interface for attachment to a second transmission medium having a relatively low transmission speed, and a first egress interface for attachment to a third transmission medium. Processing means is provided for receiving packet forwarding information across said first transmission medium via said first ingress interface, for using the received packet forwarding information to prepare for onward forwarding of packets subsequently received across said second transmission medium via said second interface, and for forwarding such packets when received, across said third transmission media via said first egress interface.

Said first ingress interface may a radio interface with said second ingress interface being an optical fiber interface. Alternatively, said first ingress interface may be a copper wire interface whilst said second ingress interface is a fiber optic cable interface.

Said first ingress interface may a fiber optic interface arrange to receive at a first carrier frequency with said second ingress interface being a fiber optic interface arrange to receive at a second, different carrier frequency.

In a particular embodiment of the invention, the apparatus is configured to perform IP routing of packets.

BRIEF DESCRIPTION OF THE DRAWINGS

FIG. 1 illustrates signal velocities within various media;

DETAILED DESCRIPTION

Figure 2:
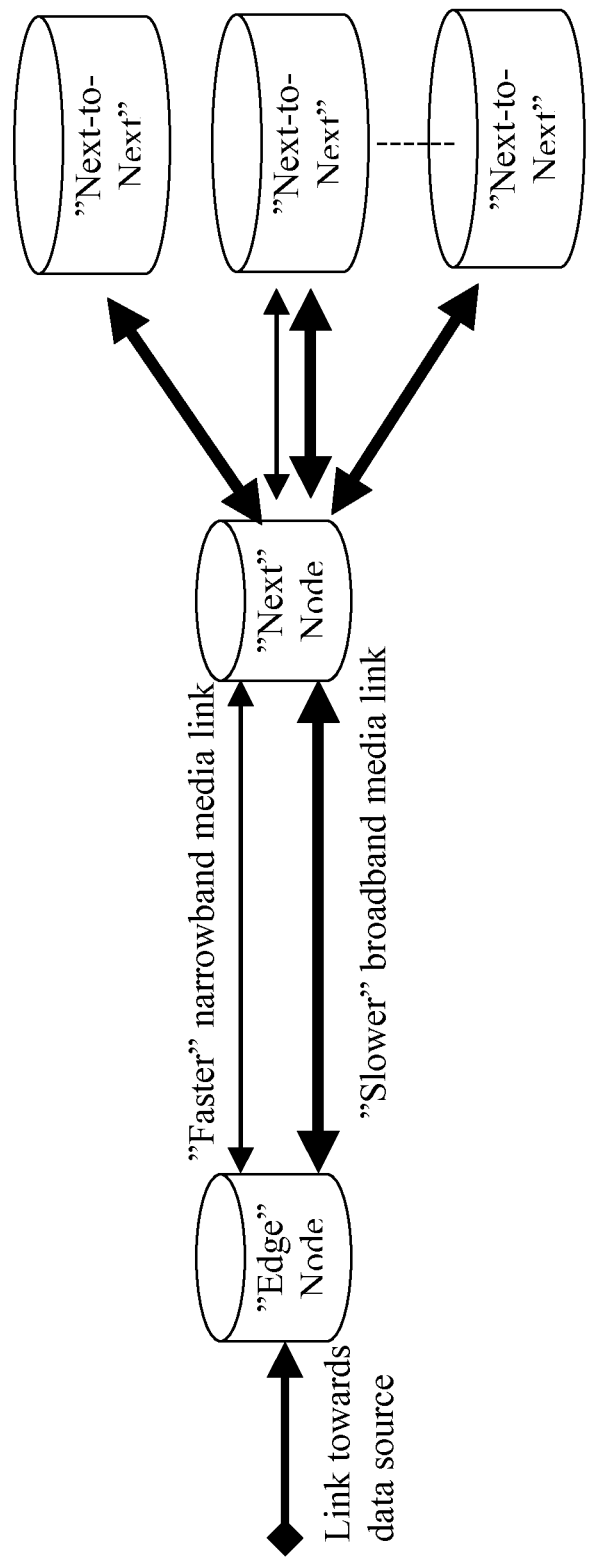
FIG. 2 illustrates the functional architecture of a dually-connected network.

Within communication networks, the signal propagation speeds and the data transmission bandwidth of various media are different. This is particularly true for high bandwidth fiber-optic cable and either lower bandwidth radio (over air/~vacuum) or copper wire. This phenomenon offers interesting possibilities to use the signal propagation speed differences and the intrinsic bandwidth capabilities of different media to enhance the performance of packet switched networks by building packet data transmission network systems that consist of two (or more) parallel networks, and splitting packet forwarding (e.g. routing) information and data, and transmitting the two components on the most suitable media. Consider for example the following existing communication media pairs which can offer suitable propagation speed differences:

Copper wire and fiber optic cable (for historical reasons these can and do co-exist in today's network topologies).

Radio-over-air and fiber optic cable.

The fact that lower and higher frequencies travel with different speeds in different fiber optic cables (or even in the same fiber optic cable) can also be of possible use over long distances (e.g. trans-ocean), where one can send a first data component over a lower frequency channel and the other component over a higher frequency channel.

Fast reservation setup can be especially important in radio access networks where there are strict timing due to the handover/soft handover requirements. Scheduling of packet transmission over the air interface can be improved by employing the present approach.

In general, the propagation of a digital signal in a medium depends on the group velocity of the signal pulses rather than the phase velocity. One can therefore obtain a first estimate of the relative differences in propagation times by comparing the phase velocities in different media. Considering the values presented in the table of FIG. 1, when travelling over a distance of s, the gained time difference is $\Delta_t = s*(1/v\_media1 - 1/v\_media2)$. In the case where media 1 is fiber and media 2 is copper wire, $\Delta_t = \sim 0.55$ μs for s=1 km. This time difference is equivalent to about 15 bits in the case of existing ADSL2+ connections. Note that in the case of copper wire the practical usable distance is, due to signal degradation, of the order of a few kilometers, e.g. less than ~5-10 km depending on the transmission technology used. In the case where media 1 is fiber and media 2 is radio over air, $\Delta_t = \sim 1.54$ μs for s=1 km. If the distance is 1000 km (e.g. transatlantic fiber optic cable+radio), $\Delta_t$ is in the region of 1.54 ms.

As a further example of a means to provide two different "channels" with different propagation speeds, one can consider long wave radio transmissions where the (very short) packet forwarding information is sent over the naturally propagating path, where the radio waves are reflected between upper layers of atmosphere and the ground/sea. If the forwarding information and the data use different channels, propagation times can be significantly different due to the length of the different channels, as much as 30 μs/d, where d is the difference in km.

A "Dual Packet Switched" network topology can be constructed in which forwarding nodes are coupled over parallel dual transmission "lines" using different kinds of media in order to create circuit switched like behaviour in a packet switched network. Edge nodes are only "dually" coupled towards another dual switching node inside the said dual packet switched network topology, and are "singly" coupled to nodes outside the special dual packet switched network. The two different media are used so that the forwarding information ('signalling data') that usually requires only low bandwidth, is sent over the faster but lower bandwidth medium and the data that requires high bandwidth is sent over the faster medium. A receiving node is alerted to the imminent arrival of the data by receipt of the forwarding information over the fast medium, and prepares the forwarding "engine" of the high bandwidth link to forward the entire data packet towards its intended destination. When the data packet is received, it can be very quickly forwarded to the next hop. If the next hop node is also dually connected to the forwarding node, the forwarding node will send the forwarding information to the next hop node over the faster link. This architecture is illustrated in FIG. 2.

The original packet may be preserved, i.e. containing both forwarding information and data, and the entire packet sent over the slower link. A "copy" of the forwarding information is then sent over the fast link. In all optical networks, i.e. comprising optical transmission and routing, actual physical splitting of the packet may occur.

Figure 3:
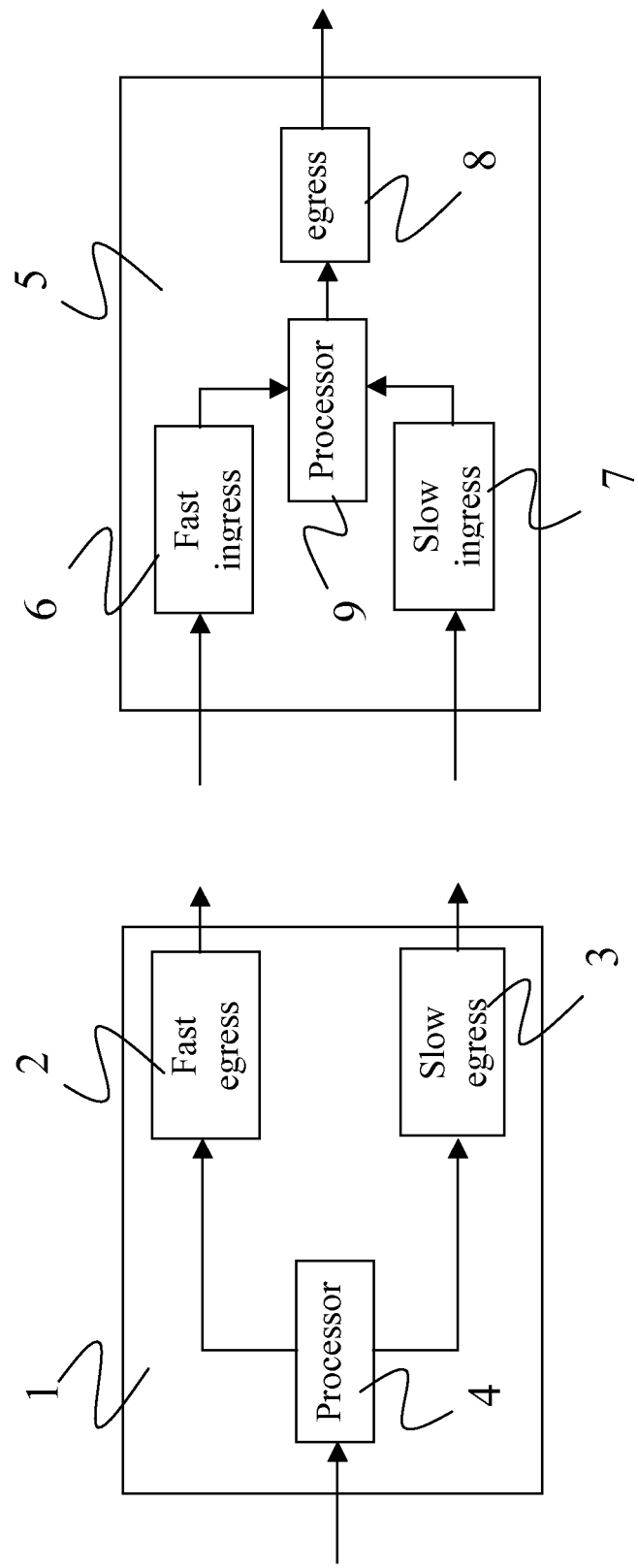
FIG. 3 illustrates schematically a sending node and a receiving node of the network of FIG. 1.
Figure 4A:
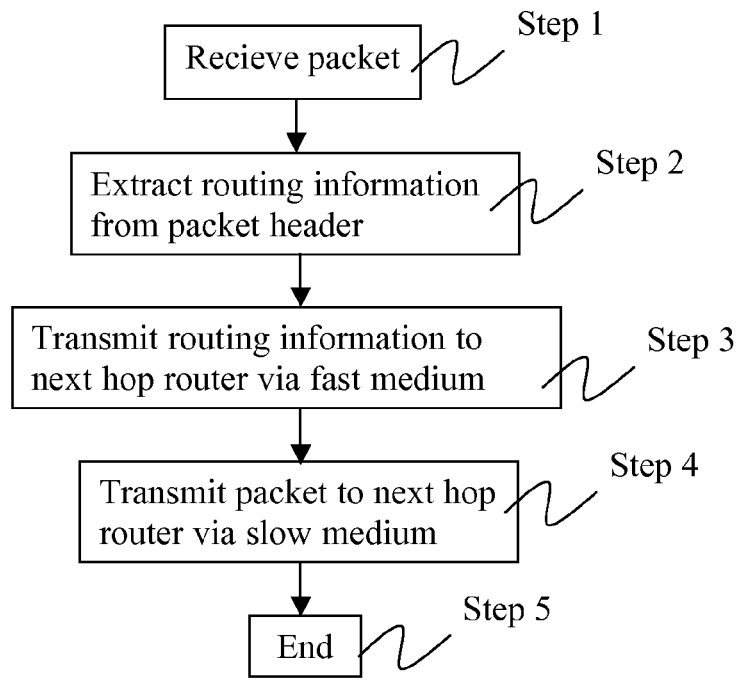
FIG. 4A is a flow diagram illustrating a process carried out at the sending node of FIG. 3.
Figure 4B:
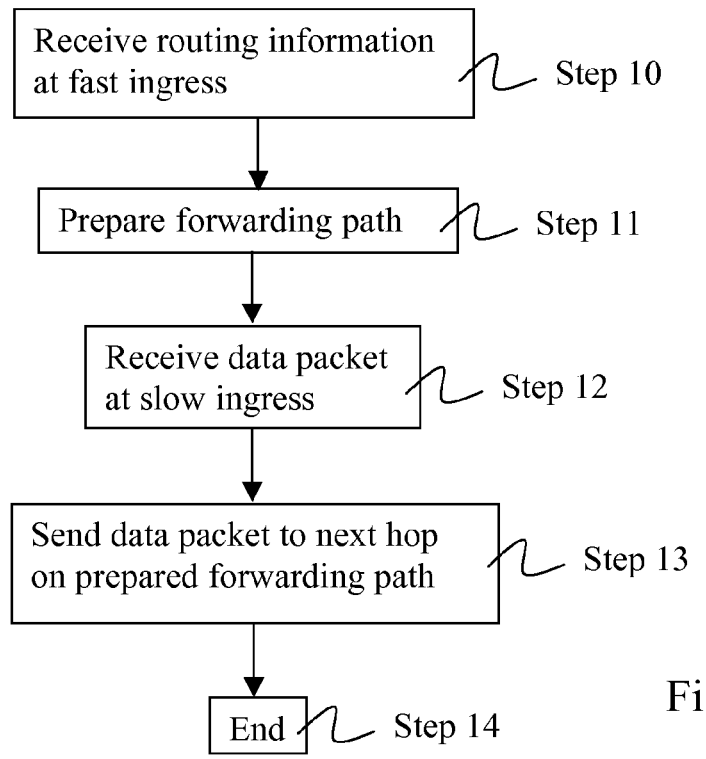
FIG. 4B is a flow diagram illustrating a process carried out at the receiving node of FIG. 3.

FIG. 3 illustrates schematically a sending node 1 and a receiving node 5, both of which represent edge nodes, interconnected by a dual packet switched network (not shown) as described. FIGS. 4A and 4B contain flow diagrams illustrating the processes carried out at the sending node and receiving node respectively.

The sending node 1 comprises a fast egress interface 2 and a slow egress interface 3. These are responsible respectively for forwarding the signalling information and the packet data. A processor 4 is responsible for extracting routing information from incoming packets (steps 1 and 2), and for passing the routing information to the fast egress 2 and the data packets themselves to the slow egress 3 (steps 3 and 4). The receiving node 5 comprises a fast ingress interface 6 for receiving signalling from the sending node (step 10), and a slow ingress interface 7 for receiving data packets from the sending node (step 12). A processor 9 inspects received signalling, and pre-configures the packet forwarding mechanism in preparation for receipt of a data packet (step 11). When that packet is received, the processor forwards it over an egress 8 in accordance with the pre-configured forwarding mechanism (step 13).

The present proposal may be applied in an application specific way. Applications where the proposal may be advantageously employed include:

Opening a priority path for emergency calls, and in particular for data intensive emergency calls that may involve video and medical data streams, or other public safety related communications.

Opening a priority path for national security related data transmissions that need to go through public network nodes.

Priority flow handling has been specified recently for real-time data flows [Francois Le Faucheur, James Polk Resource: ReSerVation Protovol (RSVP) Extensions for Emergency Services, IETF draft, http://www.ietf.org/internet-drafts/draft-ietf-tsvwg-emergency-rsvp-03.txt]. The standard provides for advance signalling before a priority flow is sent. In each forwarding element resources are reserved for the priority flow. If there are not enough resources in a forwarding node, one or more lower priority flows are pre-empted. The present proposal may be advantageously employed to provide this advanced signalling. The signalling messages and priority data packets are sent substantially at the same time. The propagation time difference between the signalling and priority data allows the forwarding elements to perform the necessary action in advance: e.g. reserve the resources, drop lower priority packets, or schedule lower priority packets into a lower priority queue according to the IETF standard.

The present proposal can also be used to provide different Quality-of-Service (QoS) classes for various different business scenarios. The NSIS working group of the IETF is currently standardising a new QoS signaling protocol. The NSIS signalling protocol consists of two layers: signalling transport (NTLP) and signalling application layers (NSLP) [R. Hancock et al., Next Steps in Signaling (NSIS): Framework, RFC 4080, http://www.ietf.org/html.charters/nsis-charter.html]. NTLP currently allows for transporting the signaling messages across the same path as the data packets (on-path signaling). There are however proposals to extend NTLP for off-path signalling, which means that the signalling messages do not necessarily have to follow the data path. This would allow use of the present proposal to achieve faster QoS reservation. The signaling reservation messages are sent at substantially the same time or earlier than the data packets, with the data packets being sent before waiting for the reservation response message. Using the faster signalling channel, resources will be reserved in the forwarding nodes (routers) by the time the data arrives. Even if the data is not sent before the reservation response message is received, i.e. according to the proposed NSIS sequence, the process is still faster than using the slower data channel for signalling.

Another mechanism for providing QoS in an IP network is that known as service differentiation (Diffserv), an IETF standard. In Diffeserv networks, IP routers handle packets according to code-points (DSCP) included in the packet headers. Based on a service level agreement, a Diffserv network provides different forwarding services for packets marked with different DSCPs. Handling tends to be statically defined in the IP routers, being defined off-line by a network management system. The present proposal would allow the DSCP of a packet to be sent in advance to the Diffserv domain, via the fast signalling channel. By the time the data reaches the Diffserv domain, the domain can be prepared to accept the data and provide the required forwarding service, typically real-time data.

Optical burst or packet switching may benefit from "pre-notification" of routing information. For instance, the usually slow optical cross connect configuration could be started well in advance so that bursts/packets could be switched solely in the optical layer without the need for optical-electrical-optical transformation.

In the case of optical packet switching (OPS), the forwarding information is encoded in the header of the optical packets. In a prior art OPS node the incoming signal in an output port is split into two parts, as illustrated in FIG. 3. One part of the signal is processed by the header processing unit, consisting of either electrical or optical devices. The header processing unit controls the switch itself, which again can be realized using electrical or optical components. Whilst header processing is occurring, the data packet has to be delayed. This is usually done by fiber delay lines (typically several kilometers long), because of the lack of optical RAM or integrated optical buffering solutions. Using the proposal presented here, the forwarding information can be sent in advance on a separate (possibly narrowband) channel from the data. This is illustrated in FIG. 4.

Figure 5:
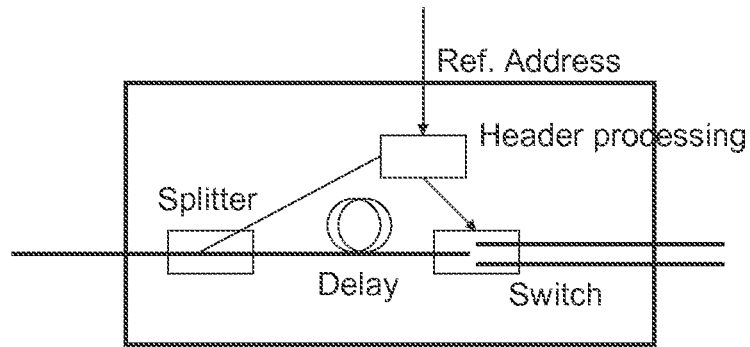
FIG. 5 illustrates a prior art packet handling mechanism at a network node.
Figure 6:
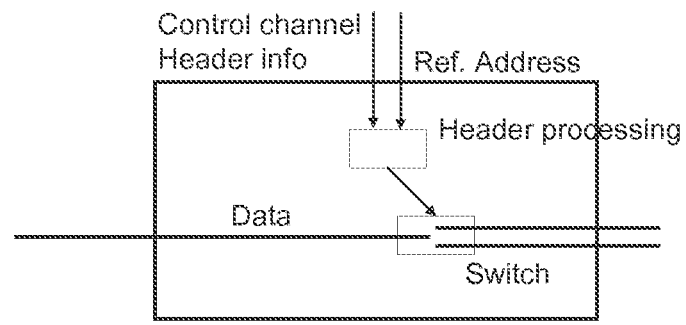
FIG. 6 illustrates packet handling at a network node within a dually connected network.
Figure 7:
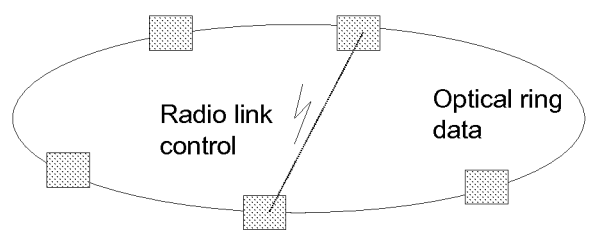
FIG. 7 illustrates an optical ring enhanced to provide a dually connected network.

FIG. 5 illustrates an optical ring in which the optical switch is controlled by a radio channel. The radio channel is faster and uses a shorter path than the fiber, therefore the header information arrives earlier into the addressed optical switch. In the node, the switch is aligned in the required way by the time the data packet arrives. This solution makes possible to eliminate at least two components in the switch: the input splitter and the input delay line. By dropping the input splitter, further components can be saved, for example an optical amplifier since the signal power is not decreased. If one can get rid of the fiber delay lines the switch may be fully integrated. Careful timing of the switch, data and header information is of course needed.

In the case of burst switching, at the edge node of the optical domain, the packets addressed to the same output edge node are assembled into larger optical packets (burst). By using signalling a light path is established. Once the light path is established, it is literally transparent to the data packets. The available bandwidth is limited by the physical properties of the fiber and the resolution of the receiver at the other end of the light path, which means very high bandwidth. Data packets are sent only if the light path is established (all switches along the data path are aligned correctly). The burst could be sent at the same time as the signalling, if the signalling can use a faster channel than the data packets. The light path is established just before the burst arrives. This solution requires less resources than the traditional burst switching solutions. Moreover, it is not necessary to delay the data whilst the light path is being established.

An advantage of certain embodiments of the present invention is that the process may be made transparent to legacy nodes (e.g. routers) which do not understand dually connected networks. These nodes may forward data packets according to conventional rules.

It will be appreciated by the person of skill in the art that various modifications may be made to the above described embodiments without departing from the scope of the present invention.

The invention claimed is:

1. A method of routing packets between nodes of a packet switched network, the method comprising:
   receiving a packet at a first node, the packet comprising routing information and payload data;
   sending said routing Information to a second node, remote from and interconnected with the first node via the packet switched network, in a routing path via a first transmission medium of the packet switched network; and
   sending said payload data to said second node via a second transmission medium of the packet switched network, said second transmission medium being arranged in parallel with said first transmission medium,
   wherein a transmission speed of the first transmission medium via which the routing information is sent is sufficiently higher than a transmission speed of the second transmission medium via which the payload is sent such that, upon receipt of said routing information, said second node has time to prepare for onward routing of the packet in advance of receipt of said payload.

2. The method according to claim 1 further comprising sending both the routing information and the payload data via said second transmission medium.

3. The method according to claim 1, wherein said first transmission medium comprises a radio interface and said second transmission medium comprises a fiber optic cable.

4. The method according to claim 1, wherein said first transmission medium comprises a copper wire and said second transmission medium comprises a fiber optic cable.

5. A first apparatus for routing packets across a packet switched network, the first apparatus comprising:
   a first egress interface for attachment to a first transmission medium;
   a second egress interface for attachment to a second transmission medium and arranged in parallel with said first transmission medium; and
   processing means for sending packet forwarding information to a second apparatus, remote from and interconnected with the first apparatus via the packet switched network, across said first transmission medium via said first egress interface, and for sending payload data to the second apparatus across said second transmission medium via said second egress interface.

6. The apparatus according to claim 5, said processing means being arranged to extract said forwarding information from a received data packet containing both packet forwarding information and payload data.

7. The apparatus according to claim 5, said first egress interface being a radio interface and said second egress interface being an optical fiber interface.

8. The apparatus according to claim 5, said first egress interface being a copper wire interface and said second egress interface being a fiber optic cable interface.

9. A first apparatus for routing packets across a packet switched network, the apparatus comprising:
   a first ingress interface for attachment to a first transmission medium;
   a second ingress interface for attachment to a second transmission medium, said second transmission medium being arranged in parallel with said first transmission medium;
   a first egress interface for attachment to a third transmission medium; and
   processing means adapted for:
      receiving packet forwarding information from a second apparatus, remote from and interconnected with the first apparatus via the packet switched network, across said first transmission medium via said first ingress interface,
      using the received packet forwarding information to prepare for onward forwarding of packets subsequently received from the second apparatus across said second transmission medium via said second interface, and
      forwarding the packets, when received, across said third transmission medium via said first egress interface.

10. The apparatus according to claim 9, said first ingress interface being a radio interface and said second ingress interface being an optical fiber interface.

11. The apparatus according to claim 9, said first ingress interface being a copper wire interface and said second ingress interface being a fiber optic cable interface.

12. The apparatus according to claim 5, the apparatus being configured to perform IP routing of packets.

* * * * *

UNITED STATES PATENT AND TRADEMARK OFFICE
CERTIFICATE OF CORRECTION

PATENT NO. : 9,706,270 B2  
APPLICATION NO. : 12/676895  
DATED : July 11, 2017  
INVENTOR(S) : Vuopionpera et al.

Page 1 of 1

It is certified that error appears in the above-identified patent and that said Letters Patent is hereby corrected as shown below:

On the Title Page

In Item (75), under "Inventors", in Column 1, Line 5, delete "Paty" and insert -- Páty --, therefor.

On Page 2, in Item (56), under "U.S. PATENT DOCUMENTS", in Column 1, Line 1, delete "Chang" and insert -- Chang et al. --, therefor.

On Page 2, in Item (56), under "U.S. PATENT DOCUMENTS", in Column 1, Line 6, delete "Gradischnig" and insert -- Gradischnig et al. --, therefor.

In the Specification

In Column 2, Line 45, delete "may a" and insert -- may be a --, therefor.

In Column 2, Line 50, delete "may a" and insert -- may be a --, therefor.

In Column 3, Line 3, delete "illustrates" and insert -- illustrates a --, therefor.

In the Claims

In Column 6, Line 47, in Claim 1, delete "Information" and insert -- information --, therefor.

In Column 6, Line 65, in Claim 2, delete "claim 1" and insert -- claim 1, --, therefor.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*